(12) United States Patent
Nagata et al.

(10) Patent No.: US 6,359,697 B1
(45) Date of Patent: Mar. 19, 2002

(54) FACSIMILE MACHINE

(75) Inventors: Katsumi Nagata, Sakai; Tamotsu Shuto, Kashihara; Shigeki Nakahara, Yamatokoriyama; Tetsuya Shibata, Yawata, all of (JP)

(73) Assignee: Sharp Kabushiki Kaisha, Osaka (JP)

( * ) Notice: Subject to any disclaimer, the term of this patent is extended or adjusted under 35 U.S.C. 154(b) by 0 days.

(21) Appl. No.: 09/141,372

(22) Filed: Aug. 27, 1998

(30) Foreign Application Priority Data

Aug. 27, 1997 (JP) .............................................. 9-230780
Sep. 16, 1997 (JP) .............................................. 9-250183

(51) Int. Cl.$^7$ .............................................. B41B 13/08
(52) U.S. Cl. ...................... 358/1.15; 358/440; 358/468; 379/100.01
(58) Field of Search ...................... 379/100.01, 100.03, 379/100.04, 100.06, 100.08, 100.12, 100.14, 111; 358/115, 440, 435, 436, 407

(56) References Cited

U.S. PATENT DOCUMENTS

| | | | |
|---|---|---|---|
| 4,924,494 A | 5/1990 | Shung | 379/100 |
| 4,926,325 A * | 5/1990 | Banton et al. | 364/408 |
| 4,969,184 A * | 11/1990 | Gordon et al. | 379/96 |
| 5,185,784 A * | 2/1993 | Nishimoto | 379/94 |
| 5,317,415 A | 5/1994 | Kinami et al. | 358/429 |
| 5,321,741 A * | 6/1994 | Kaneko et al. | 379/100 |
| 5,340,966 A | 8/1994 | Morimoto | 235/376 |
| 5,461,488 A | 10/1995 | Witek | 358/402 |
| 5,898,763 A * | 4/1999 | Azuma et al. | 379/100.04 |
| 5,933,478 A * | 8/1999 | Ozaki et al. | 379/93.24 |
| 6,031,635 A * | 2/2000 | Momonami | 358/434 |

FOREIGN PATENT DOCUMENTS

| | | | |
|---|---|---|---|
| EP | 0781033 A2 | 6/1997 | ............ B41B/2/03 |
| JP | 61295759 A | 12/1986 | |
| JP | 6387068 A | 4/1988 | |
| JP | 01191552 A | 8/1989 | |
| JP | 05219275 A | 8/1993 | |

OTHER PUBLICATIONS

Patent Abstracts of Japan, vol. 12, No. 281, Japan 63059262 published Mar. 15, 1988.
Patent Abstracts of Japan, vol. 11, No. 231, Japan 62047256 published Feb. 28, 1987.

* cited by examiner

*Primary Examiner*—David Moore
*Assistant Examiner*—Kevin C. Kianni

(57) ABSTRACT

A conventional facsimile machine re-dials by using another telephone line after an elapse of a predetermined period of time since when a communication error after a line connection has occurred, so that it takes a predetermined period of time to re-dial by using the other telephone line, and hence a receiving end may receive data transmitted from another facsimile machine during this period. In order to prevent that, a facsimile machine of the present invention comprises: a plurality of line connecting means, each of which has a telephone line for transmitting/receiving data; a line selecting section for selecting a telephone line to be used when a plurality of telephone lines are connected; and an auto-dial sending section for changing over the telephone line currently selected by the line selecting section to another telephone line so as to make a call immediately, when the receiving end is busy.

5 Claims, 18 Drawing Sheets

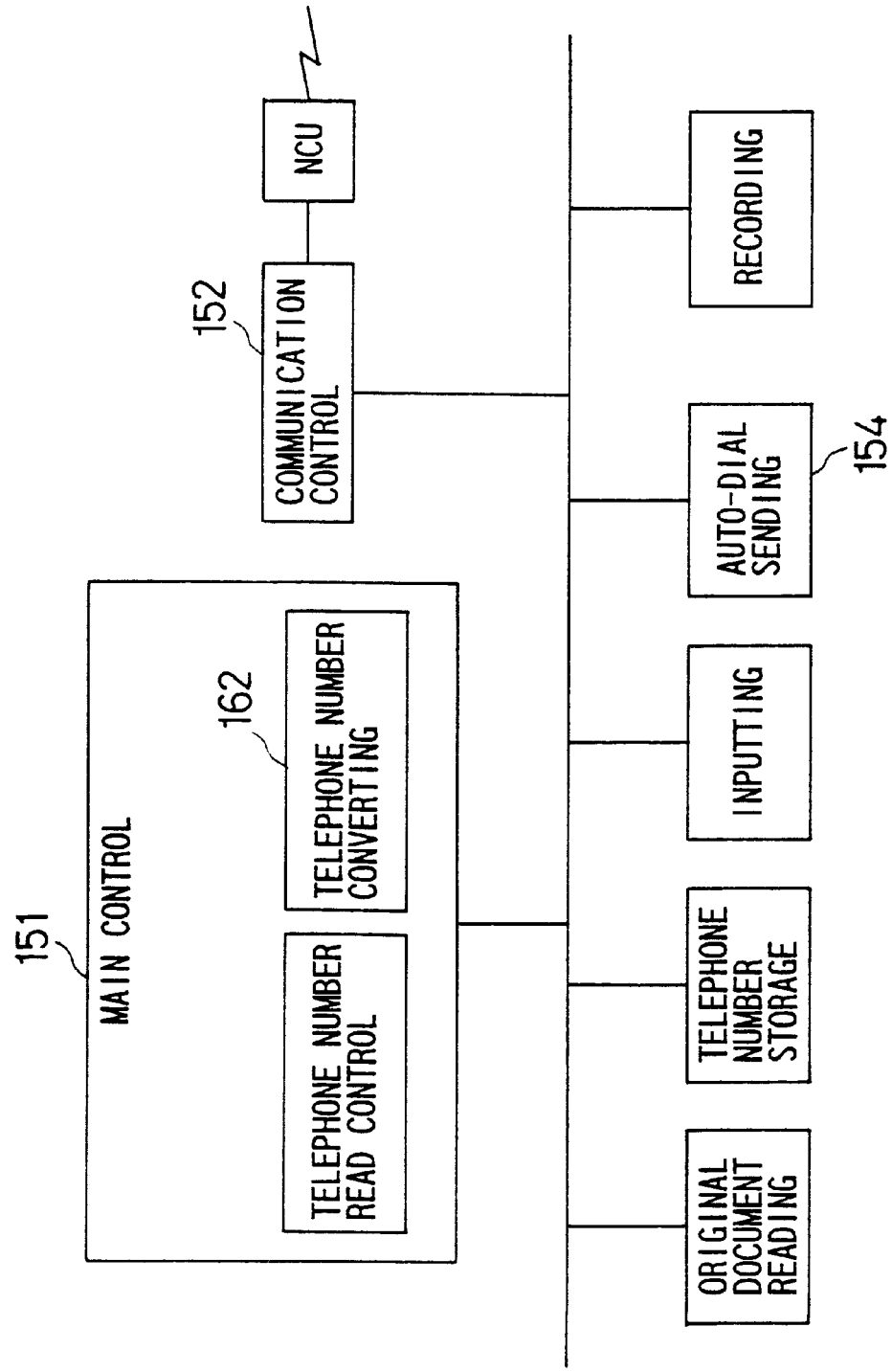

FACSIMILE MACHINE

BACKGROUND OF THE INVENTION

1. Field of the Invention

The present invention relates to a facsimile machine having a function of receiving image data in response to a request-to-send, specifically to a facsimile machine which transmits/receives image data by using a telephone line whose call fee is low and which has a plurality of telephone lines for transmitting/receiving data.

2. Description of the Related Art

A conventional facsimile machine transmits/receives image data through one telephone line. Such a facsimile machine often shares one telephone line with a telephone set, and as a prior art technology for such a machine, Japanese Unexamined Patent Publication JP-A 63-87068 (1988) discloses a control method of recognizing information of a calling end and switching one telephone line to the facsimile machine or to the telephone set.

According to the prior art technology, when a call signal enters the facsimile machine shown in FIG. 16 via a telephone line 101 from the calling end, a call signal detecting circuit 119 detects it and outputs a call receiving signal indicative of that to a CPU 127. Receiving this call receiving signal, the CPU 127 changes over a movable contact 111a of a switch 111 to a terminal 111b to which a voice information sending circuit 121 and a response signal detecting circuit 123 are connected, and then inquires through the voice information sending circuit 121 with which of a telephone set 103 and a facsimile machine 105 the calling end desires to communicate. Then, in response to the voice information, a voice response or a transmission signal of a facsimile machine is returned from the calling end, so that the CPU 127 discriminates it and connects the line 101 to the telephone set 103 or to the facsimile machine 105.

Thus, by inquiring of the calling end about the desired communication counterpart and then connecting a communication device such as a telephone set and a facsimile machine to the telephone line, desired one of the plurality of communication devices sharing one telephone line can be reliably connected to the line.

A facsimile machine which has a plurality of telephone line terminals and changes over telephone lines to be used in accordance with the rate of use of each telephone line is described in Japanese Unexamined Patent Publication JP-A 5-219275 (1993). FIG. 17 shows this prior art facsimile machine. This prior art facsimile machine reads an original document to be transmitted by reading means 131 and outputs a received original document by output means 132. When a call is made from the outside, first line communication control means 135, second line communication control means 136 or third line communication control means 137, which are currently idle, receives the call. Line selecting means 134 decides the number of telephone lines to be used based on the number of original documents to be received, the rate of use of the telephone lines and storage means 133, and so on, and gives an instruction of receiving the call to the first line communication control means 135, the second line communication control means 136 or the third line communication control means 137. Then, the line communication control means which has received the instruction receives the call.

Such a prior art facsimile machine is capable of improving the rate of use of a facsimile line, reducing a stand-by time for receiving data and decreasing the probability of call loss from the outside, by storing a plurality of lines in one facsimile machine and deciding a telephone line for receiving a call based on the rate of use of the storage means 133, the number of original documents to be received and the state of each telephone line. However, the prior art facsimile machine changes over the receiving line depending on the use frequency of the telephone line as described above, and furthermore, it requires the operator to change over the state of connection manually when transmitting/receiving image data by changing over from one telephone line to the other.

Japanese Unexamined Patent Publication JP-A 1-191552 (1989) discloses another prior art facsimile machine. This prior art facsimile machine has a plurality of transmitting/receiving telephone lines. In the facsimile machine shown in FIG. 18, discriminating means 151 discriminates whether there is a line error after a line connection or not, i.e., whether a communication with the counterpart has failed or not, and gives a result thereof to telephone number changing means 162. When it is determined that the communication with the counterpart has failed due to the line error, the telephone number changing means 162 gives another telephone number specifying the same counterpart with the previous one to an auto-dialing function 154. After a predetermined period of time, re-dialing control means 152 activates the auto-dialing function 154 to which the other telephone number has been given so as to perform a re-dialing operation. When the communication with the counterpart fails due to a line error again, another telephone number specifying the same counterpart with the previous one is given to the auto-dialing function 154 to activate and make it perform another re-dialing operation after a predetermined period of time. Thereby, the probability to communicate with the counterpart right away can be increased.

However, because the prior art facsimile machine shown in FIG. 18 re-dials by using another telephone line after the elapse of the predetermined period of time since when the line error after the line connection has occurred, it takes a predetermined period of time until the re-dialing operation is performed by using another telephone line, and the receiving end might receive data transmitted from another facsimile machine during the predetermined period of time.

SUMMARY OF THE INVENTION

Accordingly, it is an object of the present invention to provide a facsimile machine which is capable of automatically utilizing a telephone line whose call fee is low and of suppressing a total communication cost, by recognizing a telephone line used by a calling end from a telephone number registered by the calling end and by comparing the call fee of this telephone line with that of telephone lines available for the receiver.

It is another object of the invention to provide a facsimile machine in which a time until re-dialing is shortened to increase the probability of connection between the calling end and the receiving end by changing over a telephone line currently selected by line selecting means to another telephone line and by immediately making another call when the receiver is busy.

In order to achieve one of the above-mentioned objects, in a first aspect of the invention, there is provided a facsimile machine having a function of receiving image data in response to a request-to-send, comprising:

a plurality of line connecting means (22a, 22b), each of which has a telephone line (LA, LB) for transmitting/receiving data;

calling number recognition means (4a) for recognizing a calling number of a calling end;

registering means (4a) for registering the telephone number recognized by the calling number recognition means (4a);

sending means (4a) for sending the telephone number registered by the registering means by using the second telephone line (LB) among the plurality of telephone lines (LA, LB); and request-to-send control means (4a) for ending a pre-communication process of the first telephone line (LA) to disconnect the first telephone line (LA) at the point of time when a pre-process of the second telephone line (LB) is completed by the sending means (4a) and making a request-to-send through the second telephone line (LB).

According to the first aspect of the invention, the facsimile machine can make a request to send image data by using the other telephone line (LB) on the way of the communication operation so as to receive the image data, so that it can receive the image data through a line whose call fee is lower by utilizing a difference of call fees of subscribing telephone lines. Therefore, it is possible to shorten call time as well as suppress the total communication cost.

In a second aspect of the invention, the facsimile machine comprises:

telephone line recognizing means (4a) for recognizing a telephone line to which the calling end subscribes, from the calling number recognized by the calling number recognizing means (4a);

call fee comparing means (4a) for comparing a call fee of the telephone line to which the calling end subscribes, with that of the telephone line to which the receiving end subscribes;

telephone line selecting means (4a) for selecting a telephone line whose call fee is lower based on a comparison result by the call fee comparing means (4a);

registering means (4a) for registering the telephone number recognized by the calling number recognizing means (4a);

sending means (4a) for sending the telephone number registered by the registering means (4a) by using the second telephone line (LB) among the plurality of telephone lines (LA and LB); and request-to-send control means for ending a pre-communication process of the first telephone line to disconnect the first telephone line at the point of time when a pre-process of the second telephone line is completed and making a request-to-send through the second telephone line, in the case where the call fee of the second telephone line selected by the telephone line selecting means (4a) is lower than that of the first telephone line used by the calling end.

According to the second aspect of the invention, the telephone line to which the calling end subscribes is recognized from the telephone number registered by the calling end, and a request to send image data is made by utilizing the other telephone line of the receiving end on the way of the communication operation in the case where the call fee of the telephone line to which the receiving end subscribes is lower than that of the telephone line to which the calling end subscribes, whereby a difference of call fees of the subscribing lines is utilized to automatically select a telephone line whose call fee is lower and to receive the image data. Therefore, it is possible to shorten call time as well as automatically suppress the total communication cost.

In order to achieve the other object of the invention, in a third aspect of the invention there is provided a facsimile machine having a function of receiving image data in response to a request-to-send, comprising:

a plurality of line connecting means (122a, 122b), each of which has a telephone line for transmitting/receiving data;

line selecting means (122c) for selecting a telephone line to be used when a plurality of telephone lines are connected; and re-dialing means (122j) for changing over the telephone line currently selected by the line selecting means (122c) to another telephone line so as to immediately make a call, when the receiving end is busy.

According to the third aspect of the invention, when the receiving end is busy, the telephone line currently selected from among 122a and 122b by the line selecting means can be changed over to the other line so as to immediately make a call, so that a stand-by time during which no call is made to the receiving end can be shortened and the probability of establishing a connection to the receiving end whose line use frequency is high can be increased.

In a fourth aspect of the invention, the re-dialing means (122j) re-dials through the same line when the receiving end is busy, and changes over the telephone line currently selected by the line selecting means (122c) to another telephone line so as to re-dial when a number of times of re-dialing exceeds a predetermined number of times.

According to the fourth aspect of the invention, the re-dialing means (122j) re-dials through the same line when the receiving end is busy, and changes over the telephone line currently selected by the line selecting means (122c) to the other telephone line so as to re-dial when the number of times of re-dialing exceeds the predetermined number of times, so that the number of times of re-dialing to the receiving end can be increased within the predetermined period of time. Still more, the stand-by time in one line can be prolonged continuously as a result and this stand-by time can be used for transmitting/receiving new data while the re-dialing state is maintained.

In a fifth aspect of the invention, the facsimile machine comprises:

communication error detecting means (122i) for detecting that a line is disconnected due to a communication error in course of communication; and re-dialing means (122j) for changing over the telephone line selected by the line selecting means (122c) and immediately starting to make a call to the receiving end by using the other telephone line when the communication error detecting means (122j) detects the communication error.

According to the fifth aspect of the invention, when a communication error occurs, the telephone line currently selected by the line selecting means (122c) is changed over to the other telephone line, so that a call can be immediately made. Therefore, a stand-by time during which no call is made to the receiving end can be shortened and the probability of establishing a connection to the receiving end whose line use frequency is high can be increased.

BRIEF DESCRIPTION OF THE DRAWINGS

Other and further objects, features, and advantages of the invention will be more explicit from the following detailed description taken with reference to the drawings wherein:

FIG. 18 is a block diagram showing a control section of a third prior art facsimile machine.

DETAILED DESCRIPTION OF THE PREFERRED EMBODIMENTS

Figure 1:
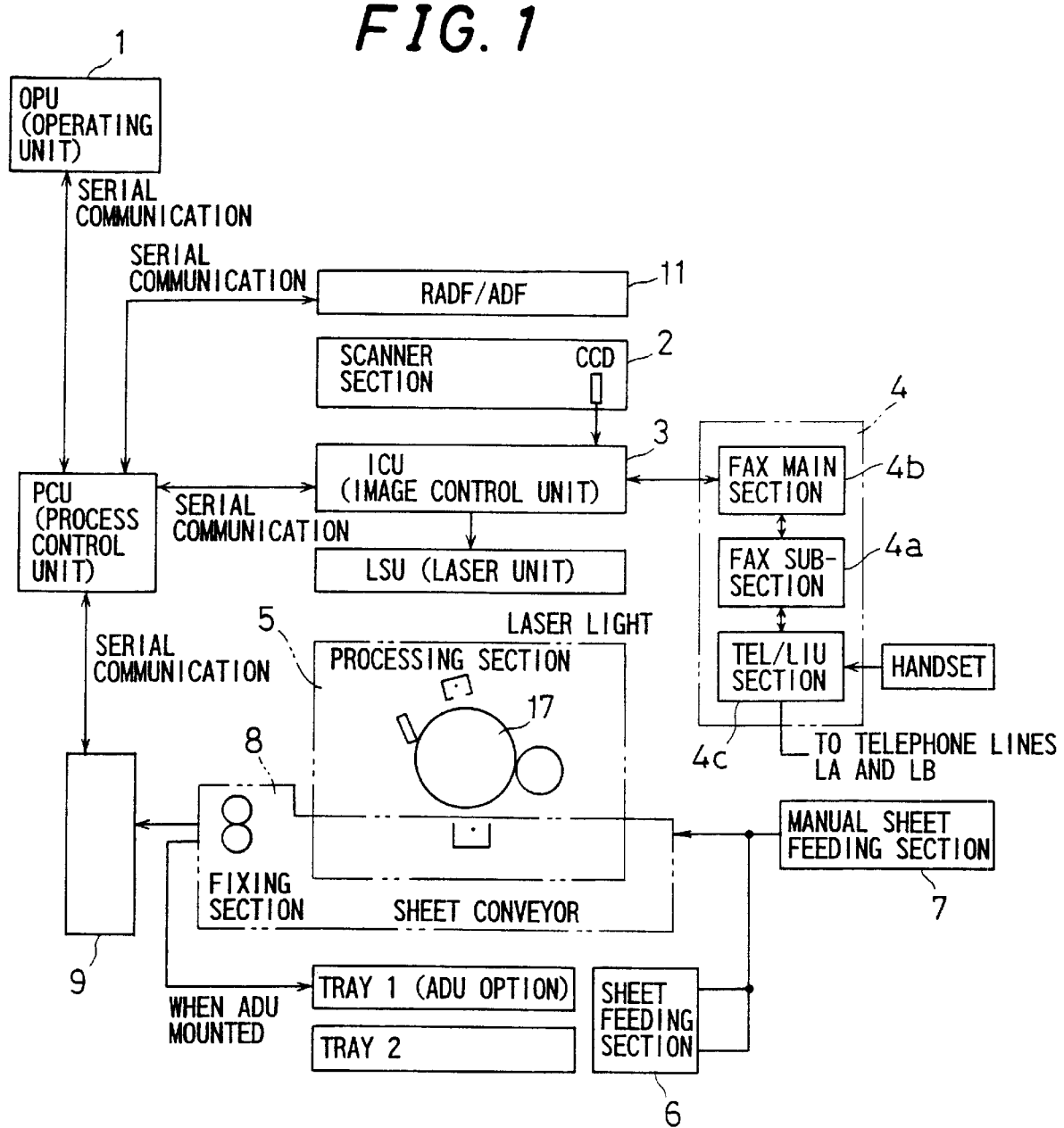
FIG. 1 is a block diagram showing a mechanical structure of a digital copier equipped with a facsimile machine according to a first embodiment of the present invention.

Now referring to the drawings, preferred embodiments of the invention are described below.

Figure 2:
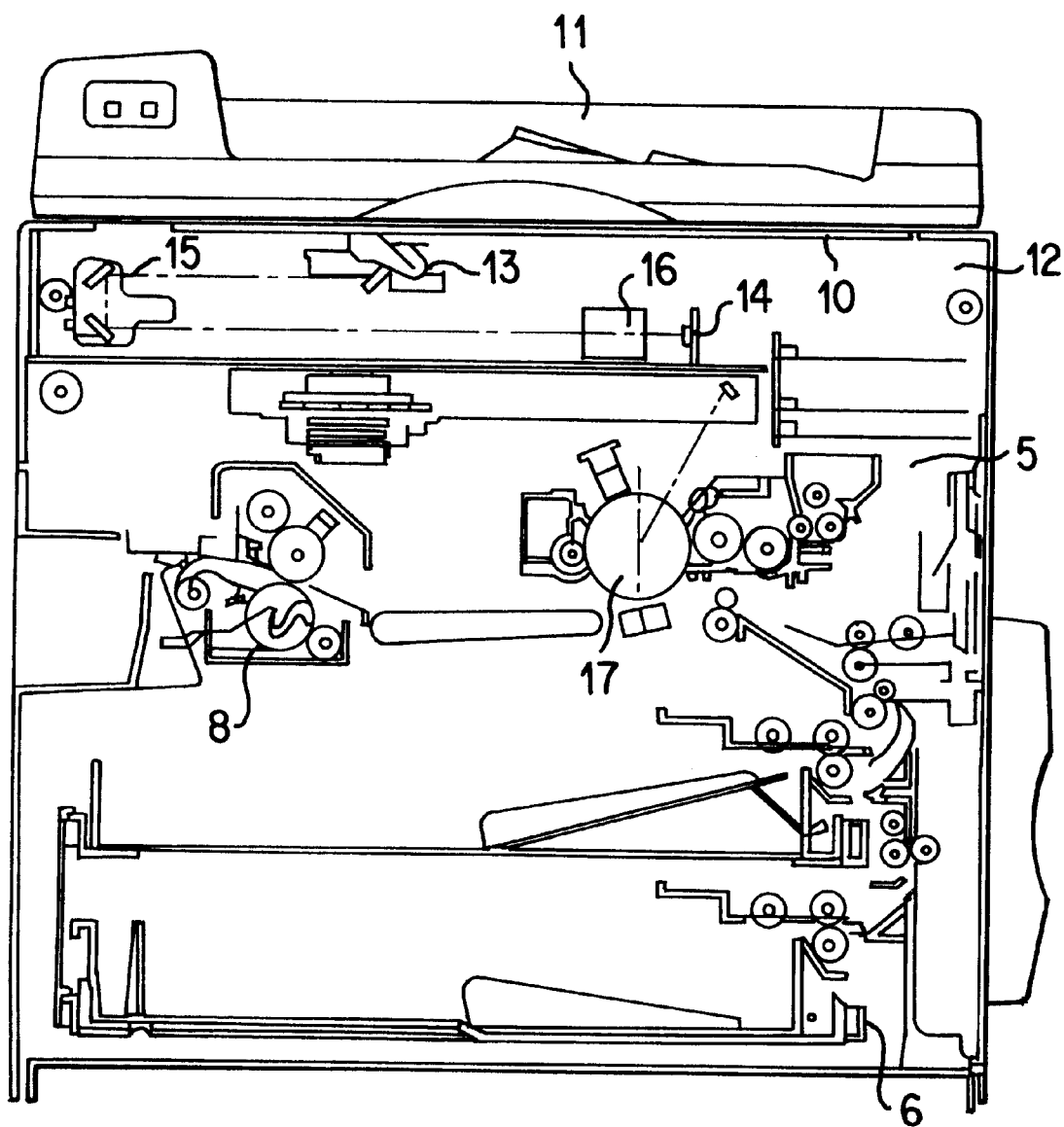
FIG. 2 is a section view of the digital copier equipped with the facsimile machine according to the first embodiment of the invention.

FIG. 1 is a block diagram showing a mechanical structure of a digital copier equipped with a facsimile machine according to a first embodiment of the invention, and FIG. 2 is a section view of the digital copier. This digital copier is equipped with an operating unit 1, a scanner section 2, an image control unit (ICU) 3, a FAX section 4, a processing section 5, a sheet feeding section 6, a manual sheet feeding section 7, a fixing section 8, and a sorter 9.

The scanner section 2 includes an original document platen 10 made of transparent glass, a re-circulating automatic original document feeder (abbreviated as RADF) 11, and a scanner unit 12.

The RADF 11 is constructed so as to cause the scanner unit 12 to read one side or both sides of an original document in accordance with a selection made by the operator, by setting a plurality of original documents at a time and automatically feeding the original documents one by one to the original document platen 10.

The scanner unit 12 includes a lamp reflector assembly 13 for exposing an original document, a plurality of reflecting mirrors 15 for guiding a reflected light image obtained from the original document to a charge-coupled device (abbreviated as CCD) 14 and a lens 16 for forming the reflected light image from the original document onto the CCD 14.

The operating unit 1 includes a control display screen, a key switch and an operation warning lamp necessary for the operator to control the digital copier.

The processing section 5 forms an electrostatic latent image on the surface of a photoreceptor 17, develops the electrostatic latent image to manifest as a toner image which is a visual image, and transfers the toner image onto a copy sheet.

A PPC (Plain Paper Copier) makes copies through six steps composed of: five basic steps of charging, exposing, developing, transferring and discharging; and a cleaning step of cleaning the surface of the photoreceptor 17 to remove toner adhered on the surface of the photoreceptor 17 after the transferring step in order to repeatedly use the photoreceptor 17 and form toner images.

Figure 3:
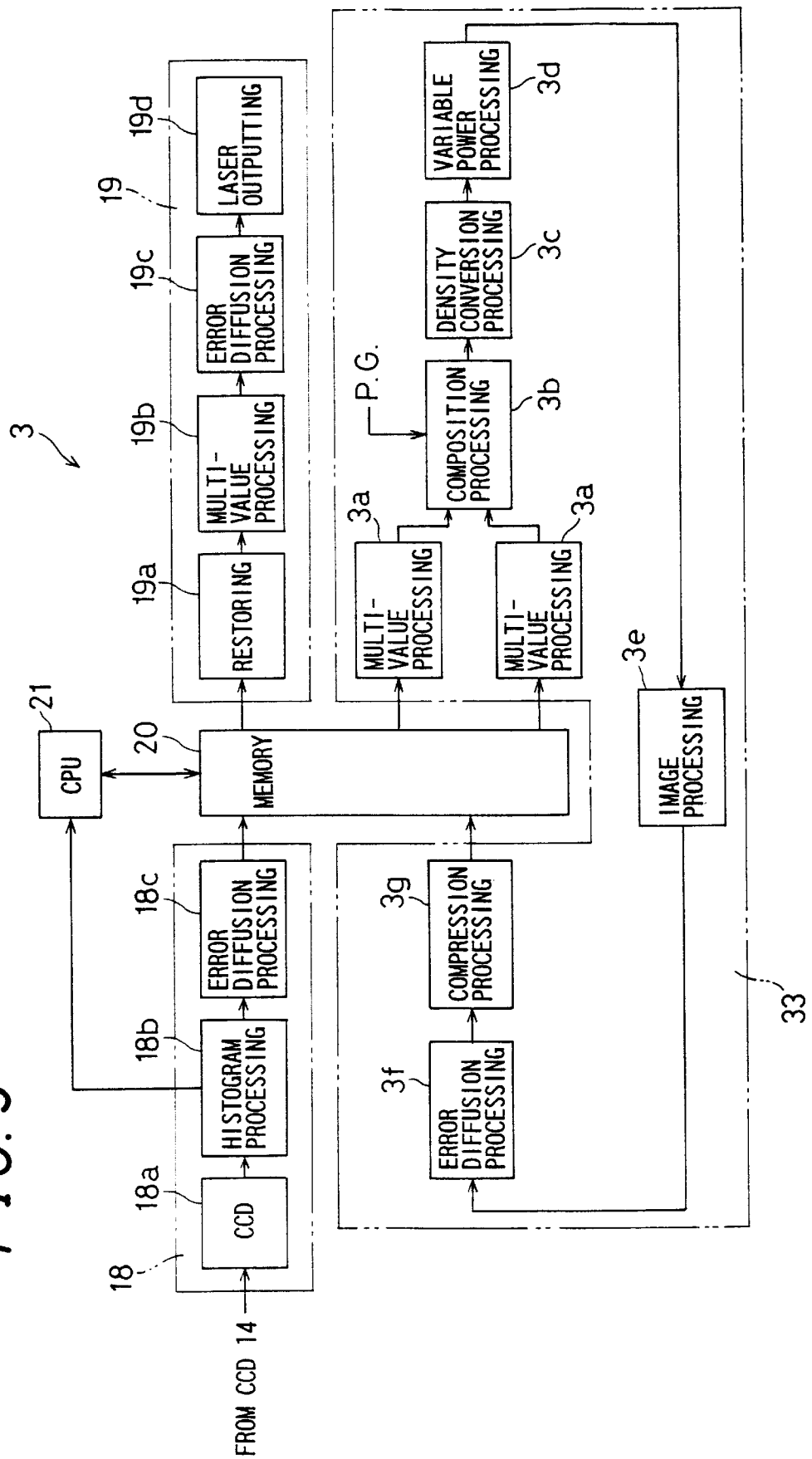
FIG. 3 is a control block diagram showing the structure of an image control unit of the digital copier.

FIG. 3 is a block diagram showing the structure of the image control unit of the digital copier. The image control unit 3 in the digital copier is equipped with an image data inputting section 18, an image data processing section 33, an image data outputting section 19, a memory 20 of RAM or the like, and a central processing unit (abbreviated as CPU) 21. The image data inputting section 18 includes a CCD section 18a, a histogram processing section 18b and an error diffusion processing section 18c. The image data inputting section 18 binarizes image data of an original document which is read through a CCD 14, processes the image data by error diffusion method while taking histogram as binary digital values, and stores once in the memory 20.

That is, after an analog electrical signal corresponding to the density of each pixel of the image data is converted to a digital signal in the CCD section 18a, an MTF (Modulation Transfer Function) correction, a white and black correction, or a gamma correction is implemented on the signal and is output to the histogram processing section 18b as a digital signal of 256 gradations (8 bits).

The histogram processing section 18b adds the digital signal which is output from the CCD section 18a for density of pixel of 256 gradations so as to obtain density information as histogram data. The obtained histogram data is sent as necessary to the CPU 21 or to the error diffusion processing section 18c as pixel data.

The error diffusion processing section 18c converts the digital signal of 8 bits/pixel which is output from the CCD section 18a into one bit (binary value) by the error diffusion method which is one type of pseudo intermediate processes, i.e., a method of reflecting a binary error on binary discrimination of the adjacent pixel, and carries out a re-allocation computation for faithfully reproducing the density of local areas in the original document.

The image data processing section 33 includes a multi-value processing section 3a, a composition processing section 3b, a density conversion processing section 3c, a scaling processing section 3d, an image processing section 3e, an error diffusion processing section 3f and a compression processing section 3g.

The image data processing section 33 is a section for converting the input image data finally to image data desired by the operator. The image data is processed in this processing section until when the finally converted output image data is stored in the memory 20.

It is noted that each processing section described above of the image data processing section 33 functions as necessary and there is a case when they do not function.

That is, the data binarized in the error diffusion processing section 18c of the image data inputting section 18 is converted again into 256 gradations in the multi-value processing section 3a.

The composition processing section 3b performs a logical operation per pixel, i.e., an operation of logical sum, logical product or exclusive logical sum, selectively. The data to be operated here is the pixel data stored in the memory 20 and bit data from a pattern generator (PG).

The density conversion processing section 3c arbitrarily sets a relation of the output density to the input density with respect to the digital signal of the 256 gradations, on the basis of a predetermined gradation conversion table.

The scaling processing section 3d performs interpolation by known data to be input in response to a specified scaling ratio, thereby finding pixel data (value of density) to an object pixel after scaling so as to implement a scaling process on a main scan after a sub-scan is scaled.

The image processing section 3e performs various image processes to the pixel data which is input from the scaling processing section 3d and performs a collection of information on a data string, e.g., a feature sampling.

The binary data is compressed by run-length encoding in the error diffusion processing section 3f. As for the compression of image data, the compression functions in the final processing loop at the point of time when the final output image data is completed.

The image data outputting section 19 includes a restoring section 19a, a multi-value processing section 19b, an error diffusion processing section 19c and a laser outputting section 19d.

The image data outputting section 19 restores the image data stored in a compressed state in the memory 20, converts it into the original 256 gradations again, implements error diffusion of four-value data presenting a half-tone which is smoother than binary data, and transfers the data to the laser outputting section 19d.

That is, the restoring section 19a restores the image data compressed by the compression processing section 3g.

The multi-value processing section 19b performs the same process with the multi-value processing section 3a of the image data processing section 33. The error diffusion processing section 19c performs the same process with the error diffusion processing section 18c of the image data inputting section 18.

The laser outputting section 19d converts the digital pixel data into ON/OFF signals for a laser based on a control signal sent from a not-shown sequence controller, thereby turning on/off the laser.

While the data handled in the image data inputting section 18 and the image data outputting section 19 described above is stored in the memory 20 basically in a form of binary data in order to reduce the capacity of the memory 20, it may be processed in a form of four-value data by taking the deterioration of image data into consideration.

The facsimile section 4 of the digital copier includes a FAX main section 4a, a FAX sub-section 4b and a TEL/LIU (Telephone/Line Interface Unit) section 4c.

The FAX main section 4a mainly controls a FAX line and a FAX function.

The FAX sub-section 4b mainly works as an image I/F with the main body of the copier and develops images as a printer function.

The TEL/LIU section 4c mainly makes a physical connection of a handset or the FAX main section 4a to the telephone lines LA and LB and performs a basic telephone control function, in response to an instruction signal from the FAX main section 4a.

Figure 4:
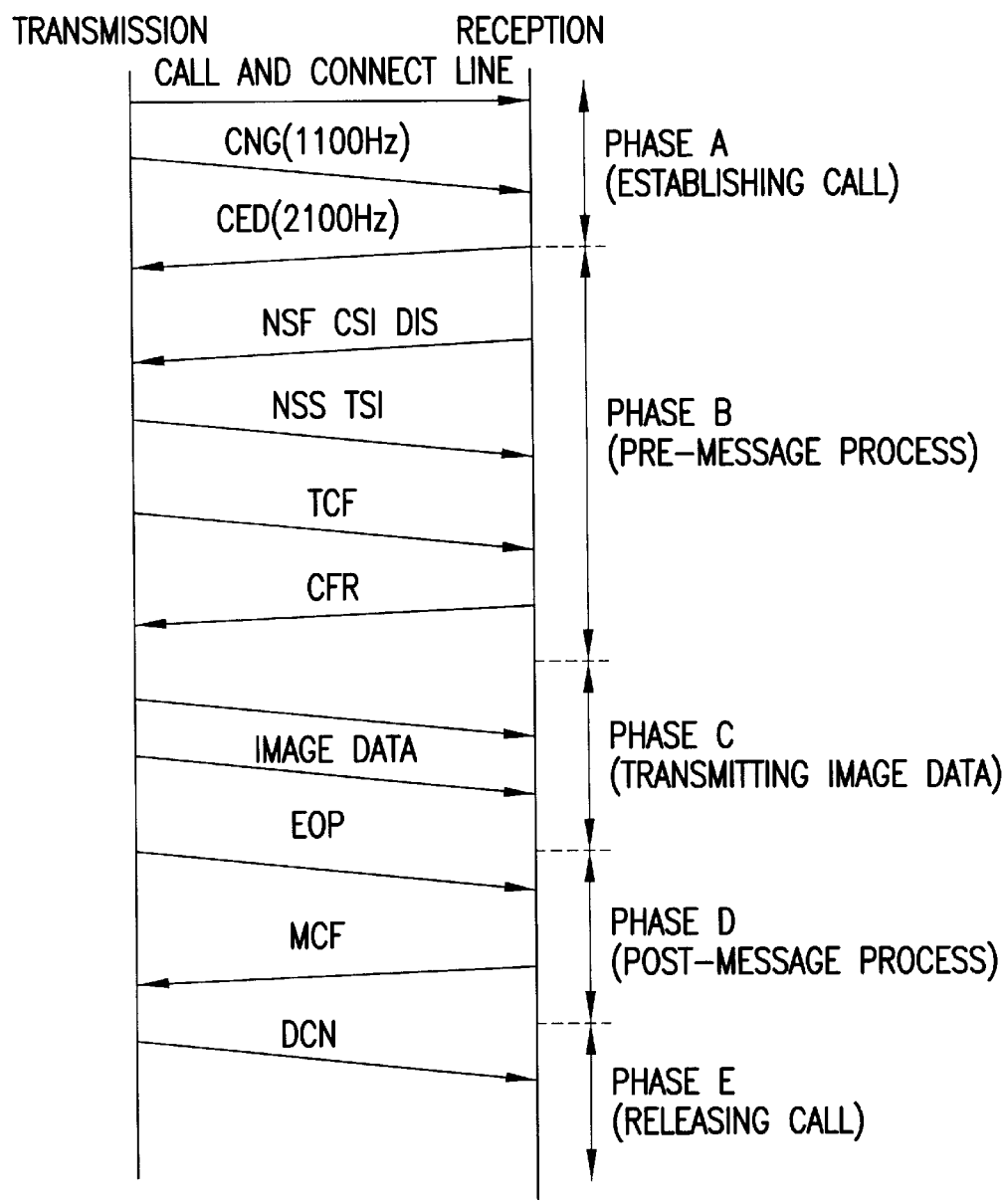
FIG. 4 shows a communication control sequence of the facsimile machine according to the first embodiment of the invention.
Figure 5:
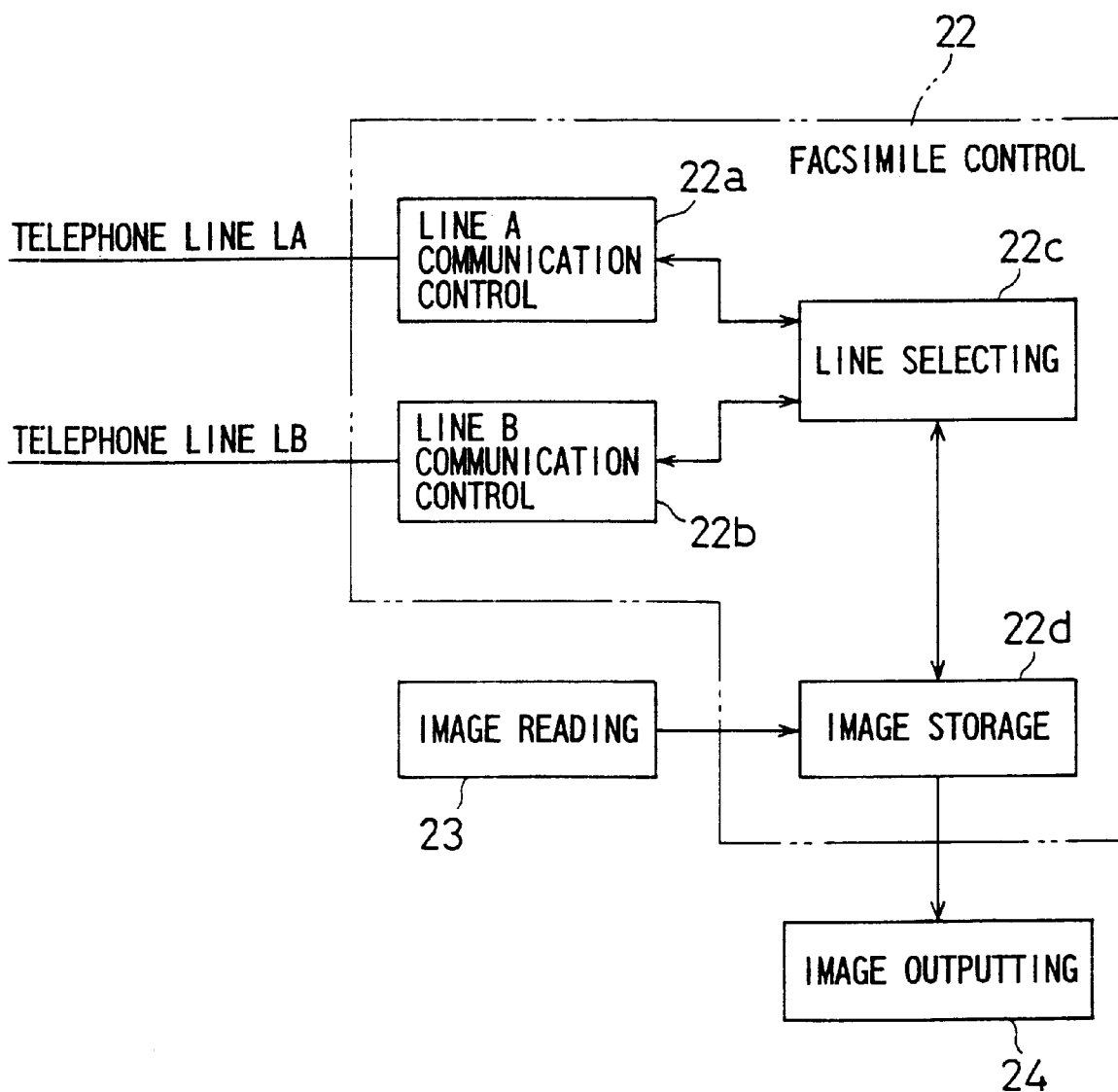
FIG. 5 is a block diagram showing a part of an electrical configuration of the facsimile machine according to the first embodiment of the invention.
Figure 6:
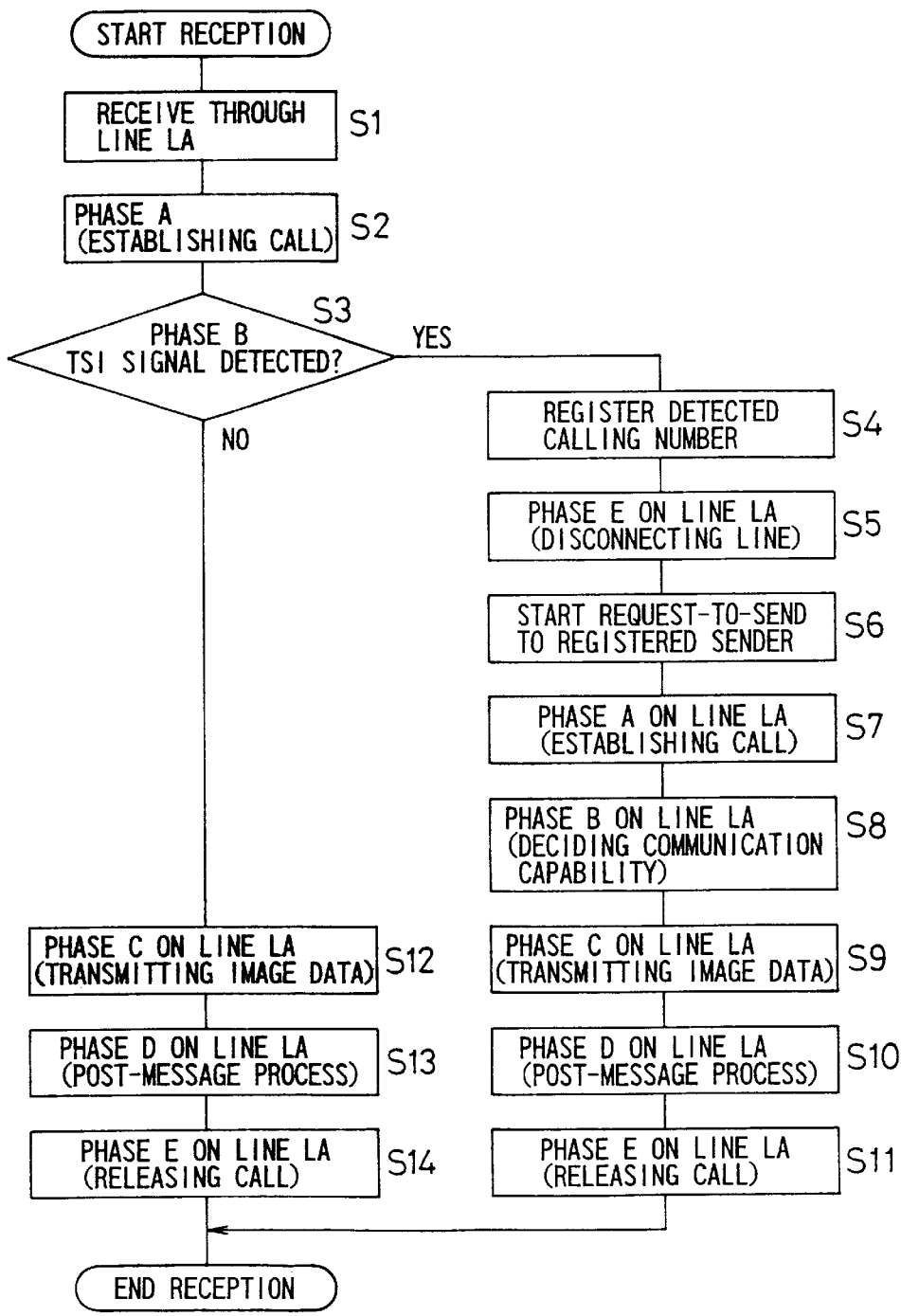
FIG. 6 is a flowchart showing a communication procedure of the facsimile machine according to the first embodiment of the invention.

FIG. 4 is a view showing a communication control sequence of the facsimile machine, FIG. 5 is a block diagram showing a part of an electrical configuration of the facsimile machine, and FIG. 6 is a flowchart showing a communication procedure in the first embodiment.

In FIG. 1, the FAX main section 4a of the facsimile section 4 comprises: a facsimile control section 22 equipped with a plurality of line connecting means (22a and 22b), each of which has a telephone line (LA or LB) for transmitting/receiving data; calling number recognition means for recognizing a calling number of a calling end; registering means for registering the telephone number recognized by the calling number recognition means; sending means for sending the telephone number which has been registered by the registering means by using the second telephone line (LB) among the plurality of telephone lines (LA and LB); and request-to-send control means for ending a pre-communication process of the first telephone line (LA) to disconnect the first telephone line (LA) at the point of time when a pre-process of the second telephone line is completed by the sending means and making a request-to-send through the second telephone line (LB).

The FAX main section configured as shown above makes a request to send image data and receives the image data by using the other telephone line LB on the way of the operation for communication, whereby it can receive the image data through a line whose call fee is lower by utilizing a difference .of call fees of subscribing telephone lines to suppress the total communication cost and to shorten the call time.

The facsimile control section 22 includes a line A communication control section 22a, a line B communication control section 22b, a line selecting section 22c, and an image storage section 22d. An image reading section 23 formed by the scanner section 2 and so on, and an image outputting section 24 formed by the processing section 5 and so on, are connected to the image storage section 22d.

When the line A communication control section 22a receives a call via the telephone line A in step S1, a phase A (establishing a call) is implemented in step S2. When a phase B of a transmission process shown in the communication control sequence of FIG. 4 is implemented, a TSI (Transmitting Subscriber Identification) signal is detected in the phase B and the calling number is recognized in step S3.

When the telephone number of the calling end is recognized, the recognized telephone number is registered in step S4. Then, in a stage of a pre-process, specifically, in a stage before sending a CFR (Confirmation to Receive) signal to the calling end, the communication of the first telephone line LA is forcibly ended once during a phase E (line disconnection) in step S5.

After the communication is ended, the receiving end now starts a request-to-send to the calling end registered as mentioned above (step S6). When the request-to-send is started, the receiving end dials the calling number to connect to the telephone line A during the phase A in step S7. After the connection, the receiving end implements the phase B (pre-message process: deciding a communication capability) in step S8, receives image data during a phase C (transmitting image data) in step S9, performs a phase D (post-message process) in step S10, and performs a phase E (releasing a call) in step S11, thereby ending the reception of the data.

Thus, after the request-to-send is started in step 6, the respective procedures of the phases A through E are executed, whereby image data stored in the memory of the calling end is received.

Accordingly, when the receiving end subscribes to a telephone line whose call fee is lower than that of the calling end (image data transmitting side), the receiving end once ends the communication in the pre-process step for receiving image data and makes a request-to-send to the calling end so as to obtain the image data through a line whose call fee is lower, whereby the total communication cost can be suppressed by using the line whose call fee is lower, than receiving the data transmitted from the calling end as it is.

When the telephone number of the calling end cannot be recognized in step S3 described above, the receiving end continues the connection of the first telephone line LA and executes the phases C (step S12), D (step S13) and E (step S14) to receive the image data.

Figure 7:
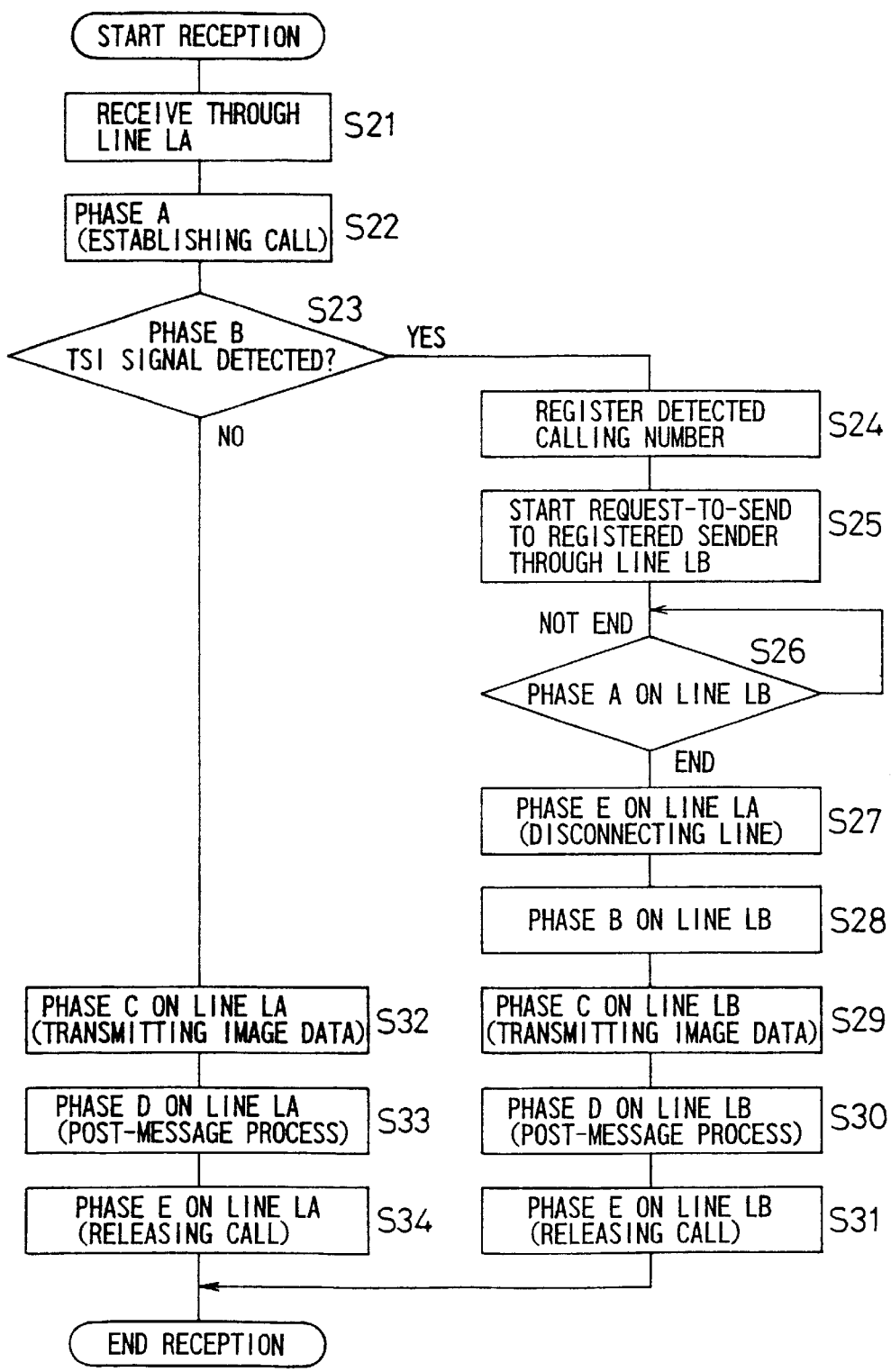
FIG. 7 is a flowchart showing a communication procedure of a facsimile machine according to a second embodiment of the invention.

Next, a communication procedure of a facsimile machine according to a second embodiment of the invention will be explained with reference to FIG. 7. The second embodiment applies to a case where both the calling end (transmitting side) and the receiving end have a facsimile machine with a plurality of lines. In this case, a telephone number to be dialed to the calling end in the request-to-send is registered in advance. This telephone number is a telephone number of a telephone line different from that used in the initial transmission selected from among the plurality of telephone lines of the calling end.

At first, when a call is received through the line LA in step S21, the phase A (establishing a call) is implemented in step S22, and when the transmission process of communication shown in the communication control sequence of FIG. 4 is carried out, the calling telephone number is recognized from a detection of a TSI signal during the phase B in step S23.

When the calling number is recognized, the recognized number is registered in step S24, the registered number of the calling end is dialed and the request-to-send is started through the second telephone line LB in step S25, the phase A (establishing a call) is implemented on the second telephone line LB in step S26. When the phase A on the second telephone line LB is ended, the communication through the first telephone line LA is forcibly ended once in the pre-process step during the phase E (disconnecting a line) in step S27.

After the communication through the first telephone line LA is ended, the phase B (pre-message process: deciding a communication capability) is implemented to the second telephone line LB in step S28, image data is received during the phase C (transmitting image data) in step S29, the phase D (post-message process) is implemented in step S30, and the phase E (releasing call) is implemented in step S31, whereby the reception of the data is ended.

Thus, step 25 is performed and the respective phases A through E are executed, whereby the image data stored in the calling end memory is received.

When the telephone number of the calling end cannot be recognized in step S23 described above, the receiving end continues the connection through the first telephone line LA and executes the phases C (step S32), D (step S33) and E (step S34) to receive the image data.

According to the second embodiment, the operation for connecting through the second telephone line LB is completed before the process for disconnecting the first telephone line LA is implemented, so that a communication time from the registration of the calling end number to the end of the phase E can be shortened.

For instance, in a case where the receiving end subscribes to a telephone line whose call fee is low, the receiving end uses another telephone line in the pre-process for receiving data and makes the request-to-send to the calling end through the telephone line whose call fee is low so as to obtain image data, so that the total communication cost can be more suppressed by using the telephone line whose call fee is low, than receiving the data transmitted from the calling end as it is.

Figure 8:
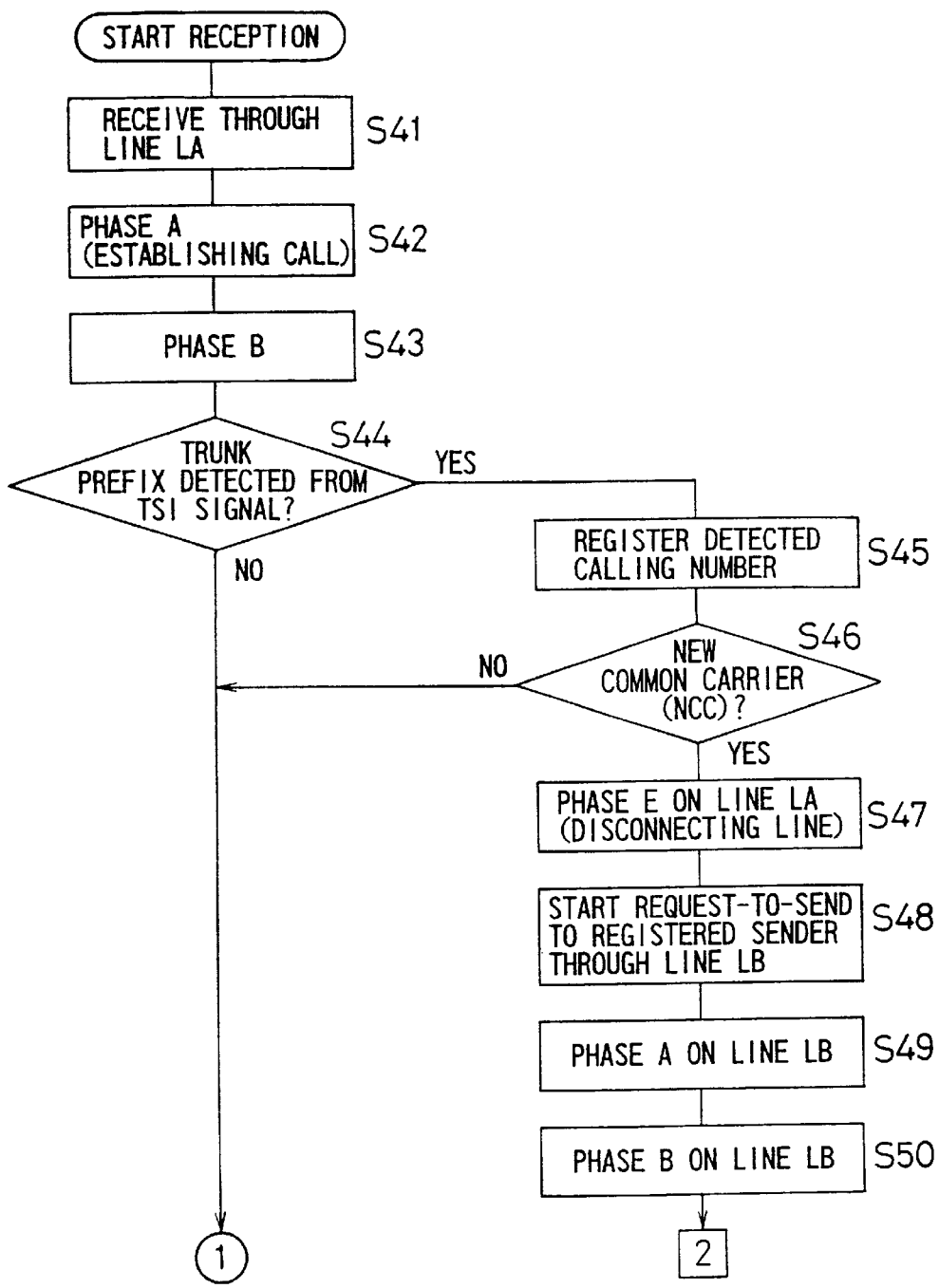
FIG. 8 is a flowchart showing a first communication procedure of a facsimile machine according to a third embodiment of the invention.
Figure 9:
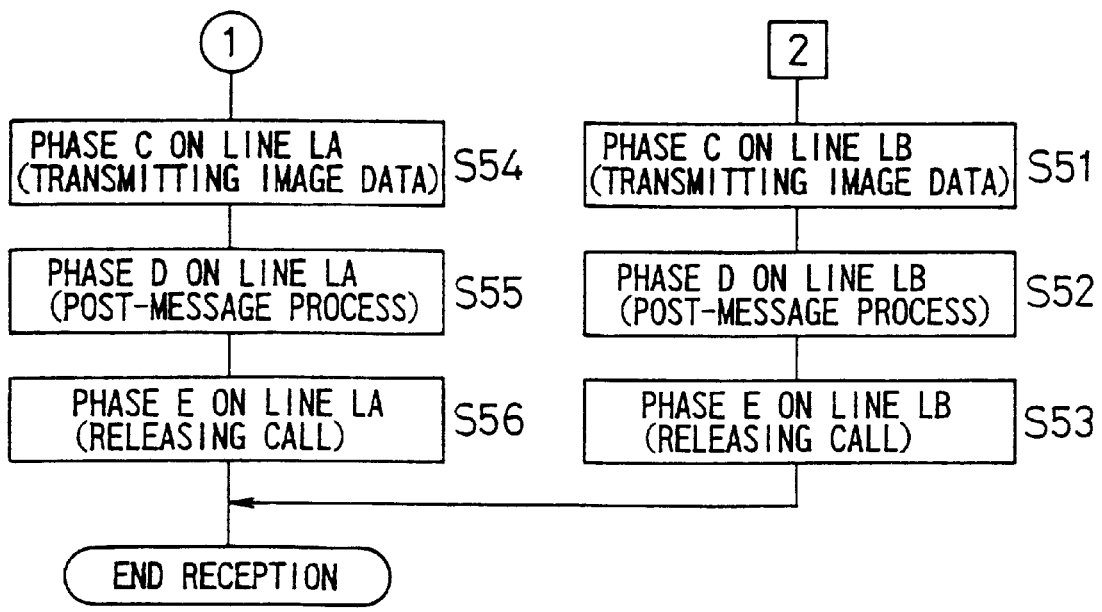
FIG. 9 is a flowchart showing a second communication procedure of the facsimile machine according to the third embodiment.

Next, a communication procedure of a facsimile machine according to a third embodiment of the invention will be explained below with reference to FIGS. 8 and 9. The third embodiment is an improved version of the second embodiment shown above and is arranged so as to automatically select a line whose call fee is lower by recognizing a trunk prefix from a received TSI signal and discriminating whether the recognized telephone line is of an NCC (new common carrier) or not. It is controlled so as to automatically use the telephone line whose call fee is lower in a case where it is more inexpensive to receive data by making a request-to-send.

The FAX main section 4a of the embodiment comprises: communication line recognizing means for recognizing a telephone line to which the calling end subscribes from the calling number recognized by the above-mentioned calling number recognizing means; call fee comparing means for comparing a call fee of the telephone line to which the calling end subscribes with that of the telephone line to which the receiving end subscribes; telephone line selecting means for selecting a telephone line whose call fee is lower based on the comparison result by the call fee comparing means; registering means for registering the telephone number recognized by the calling number recognizing means; sending means for sending the telephone number registered by the registering means through the second telephone line LB among the plurality of telephone lines LA and LB; and request-to-send control means for ending the pre-communication process through the first telephone line LA to disconnect the first telephone Aline LA at the point of time when the pre-process through the second telephone line LB is completed and making the request-to-send through the second telephone line LB, in a case where the telephone line selected by the telephone line selecting means is the second telephone line LB whose call fee is lower than that of the first telephone line LA used by the calling end.

The third embodiment applies only to a case where both the calling end (transmitting side) and the receiving end have a facsimile machine with a plurality of telephone lines. Also in this case, a telephone line to be dialed in the request-to-send to the calling end must be registered in advance.

At first, when a call is received through the first telephone line LA in step S41, the phase A (establishing a call) is implemented in step S42, and when the transmitting process of communication shown in the communication control sequence of FIG. 4 is carried out, the phase B is implemented in step S43, and a trunk prefix and telephone number of the calling end are recognized from a detection of a TSI signal in step S44.

When the trunk prefix and telephone number of the calling end are recognized, the recognized telephone number is registered in step S45 and the NCC is discriminated from the recognized trunk prefix in step S46. The registered telephone number of the calling end is dialed to start a request-tosend through the second telephone line LB, and the phase A (establishing a call) is implemented to the second telephone line LB. When the phase A to the second telephone line LB is ended, the communication is forcibly ended once in the pre-process step during the phase E (disconnecting a line) in step S47.

After the communication through the first telephone line LA is ended, a request-to-send is started through the second telephone line LB in step S48, and the phases A (step 49), B (step S50), C (step S51), D (step S52) and E (step S53) are implemented one after another, whereby the reception of data is ended.

Thus, the phases A through E are executed after the request-to-send is started, whereby the image data stored in the calling end memory is received.

When the telephone number of the calling end cannot be recognized in step S44 described above, the receiving end continues the connection through the first telephone line LA and executes the phases C (step S54), D (step S55) and E (step S56) to receive image data.

According to the third embodiment as shown above, the operation for connecting through the second telephone line LB is completedbefore the process for disconnecting the first telephone line LA is implemented, so that the communication time from the registration of the calling number to the end of the phase E can be shortened.

For instance, in a case where the receiving end subscribes to a telephone line whose call fee is low, the receiving end uses another telephone line in the pre-process step for receiving data and makes a request-to-send to the calling end through the line whose call fee is lower so as to obtain the image data. Therefore, the total communication cost can be suppressed low by using the line whose call fee is low, than receiving the data transmitted from the calling end as it is.

Figure 10:
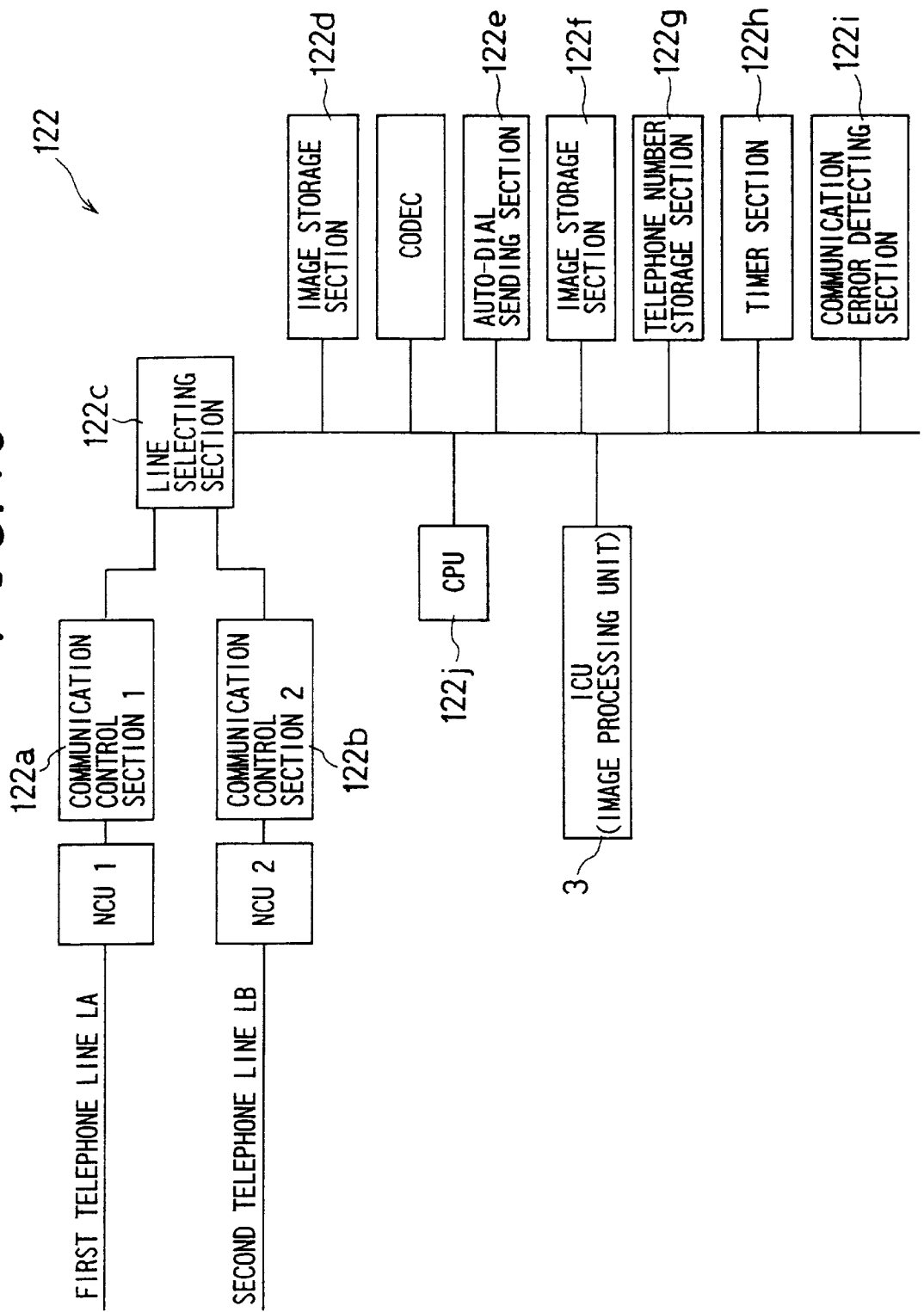
FIG. 10 is a block diagram showing a part of an electrical configuration of a facsimile machine according to a fourth embodiment of the invention.

FIG. 10 is a block diagram showing a part of an electrical configuration of a facsimile machine according to a fourth embodiment of the invention. A facsimile control section 122 of the present embodiment comprises: a first communication control section 122a to which a first line is connected via an NCU (network control unit) 1; a second communication control section 122b to which a second line is connected via an NCU 2; a line selecting section 122c; an image storage section 122d; an auto-dial sending section 122e; an image storage section 122f; a telephone number storage section 122g; a timer section 122h for counting a stand-by time until re-dialing; a communication error detecting section 122i; and a CPU 122j. The facsimile control section 122 is connected to the image control unit (ICU) 3 described above.

Figure 11:
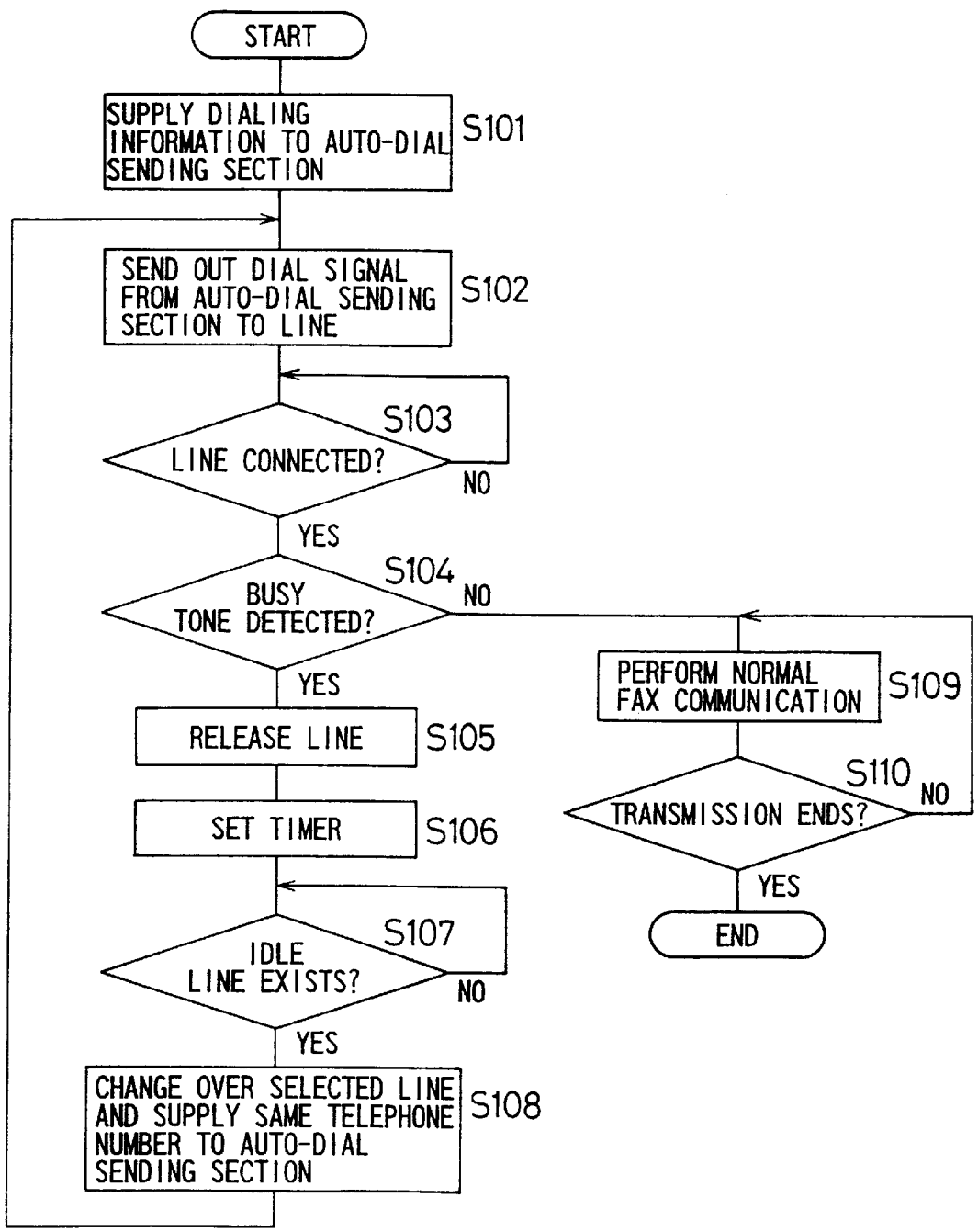
FIG. 11 is a flowchart showing a communication procedure of the facsimile machine according to the fourth embodiment.

FIG. 11 is a flowchart showing a communication procedure of the fourth embodiment. When the user starts an auto-dial transmission, the CPU 122j of the facsimile control section 122 receives dialing information via the image control unit (ICU) 3, which dialing information corresponds to a content input by the user through the operating unit 1, and sends this dialing information to the auto-dial sending section 122e in step S101. Then, the auto-dial sending section 122e sends out a dialing signal corresponding to this dialing information to a telephone line in step S102 and sends out the dialing signal to an exchange.

The line selecting section 122c selects the first line in sending out the initial signal, and hence the dialing signal is sent out to the first line through the first communication control section 122a and the NCU 1.

When the receiving end is connected to the exchange (first telephone line LA), the polarity of the line is inverted. Then, the NCU 1 informs the CPU 122j that the polarity of the line has been inverted. Then, it is discriminated whether the first telephone line LA is connected or not in step S103, and when the first telephone line LA is connected, the CPU 122j then detects a presence of a busy tone in step S104.

When the busy tone is detected, it is discriminated that the receiving end is busy and the connected first telephone line LA is released in step S105. Then, a timer corresponding to the first telephone line LA is set by the timer section 122h in step S106 and starts counting to be ready for re-dialing.

Next, the line selecting section 122c detects whether an idle line exists or not besides the first telephone line LA in step S107, and changes over the line to the idle line, i.e., the second telephone line LB in the embodiment, to give the above-mentioned dialing information to the auto-dial sending section 122e in step S108. The process returns to the above-mentioned step S102 and the same operation is repeated.

In a case where no busy tone is detected in step S104, a normal facsimile communication is implemented in step S109, and the connected line is disconnected to end the facsimile operation when the transmission of data ends in step S110.

Figure 12:
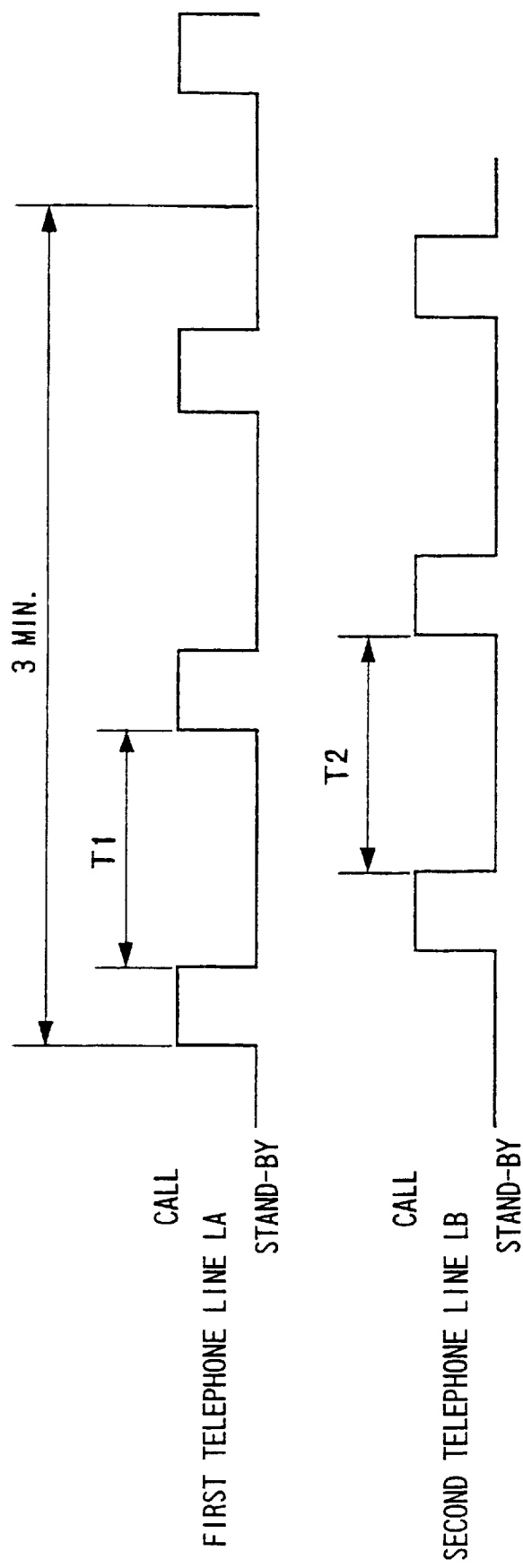
FIG. 12 is a time chart showing calling timings of the facsimile machine according to the fourth embodiment.

FIG. 12 is a time chart showing these line calling operations. When it is discriminated that the receiving end is busy as a result of making a call through the first telephone line LA, the first telephone line LA is released and a stand-by time T1 by the timer is set. In this case, the stand-by time T1 is set so that re-dialing (re-calling) is not carried out more than twice within three minutes.

After the first telephone line LA is released, a call is made to the same counterpart (receiving end) through the second telephone line LB which is idle. When the receiving end is busy also at this time, the second telephone line LB is released in the same manner and a stand-by time T2 by the timer is set.

Next, while the line selecting section 122c searches for an idle line, the first telephone line LA cannot be used because the stand-by time T1 by the timer has not been counted up yet. Therefore, the line selecting section 122c remains on stand-by until the stand-by time T1 is counted up. When the standby time T1 is counted up, the line selecting section 122c selects the first telephone line LA and starts to call the receiving end.

In a case where the busy state continues further, the line selecting section 122c remains on stand-by in the same manner with the first telephone line LA as mentioned above until the stand-by time T2 corresponding to the second telephone line LB is counted up, and changes over to the second telephone line LB at the same time as the count-up is completed, thereby starting to re-dial (re-call).

As described above, a time length of the stand-by state during which re-dialing (re-calling) is not made to the receiving end is shortened and the probability of establishing a connection to the receiving end is increased by re-dialing (re-calling) while changing over the first and second telephone lines LA and LB.

Figure 13:
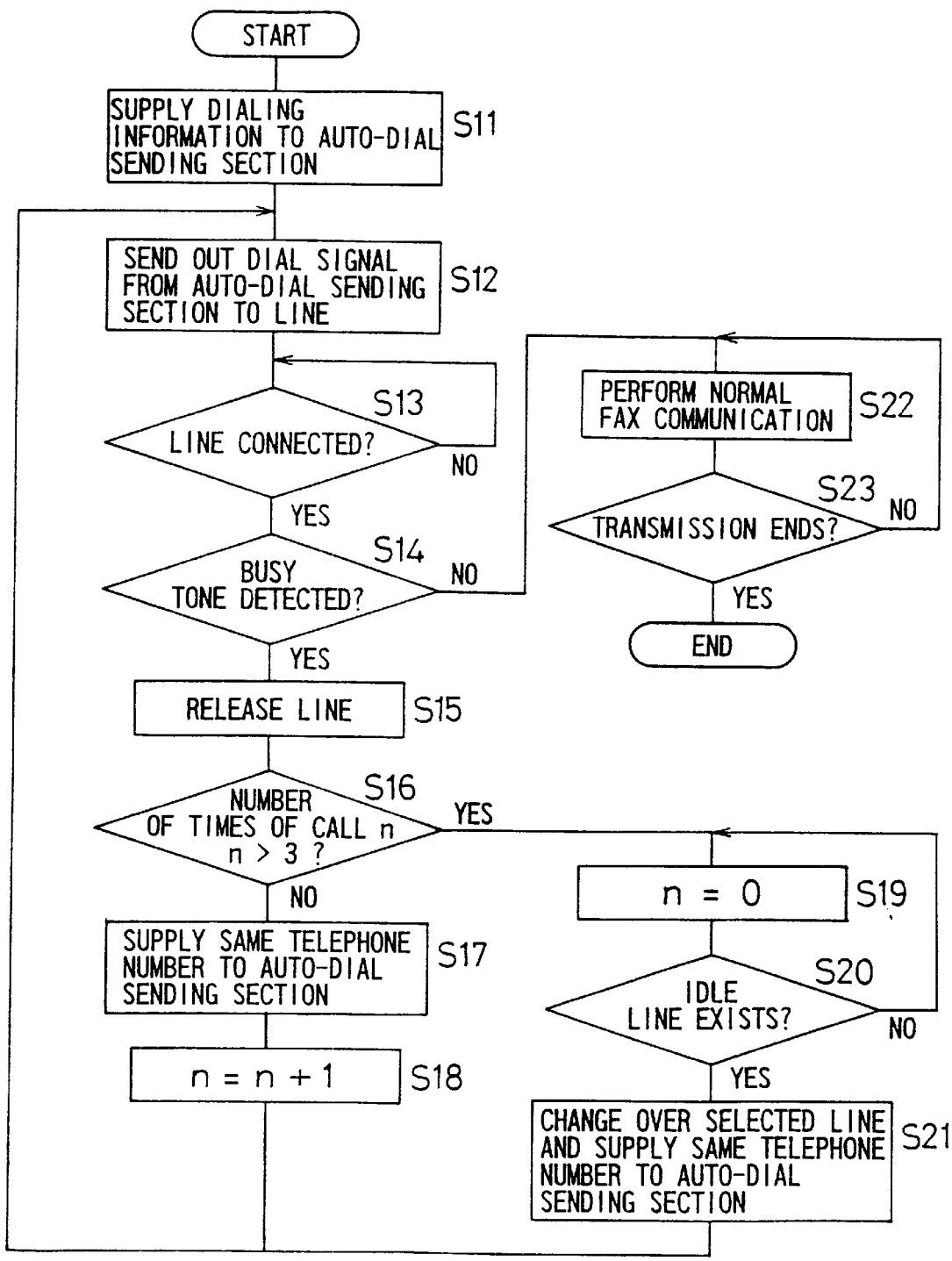
FIG. 13 is a flowchart showing a communication procedure of a facsimile machine according to a fifth embodiment of the invention.

Next, a communication procedure of a facsimile machine according to a fifth embodiment of the invention will be explained with reference to FIGS. 13 and 14.

When the user starts an auto-dialing transmission, the CPU 122j of the facsimile control section 122 receives dialing information via the image processing section (ICU) 3, which dialing information corresponds to a content input by the user through the operating unit 1, and sends this dialing information to the auto-dial sending section 122e in step S111. Then, the auto-dial sending section 122e sends out a dialing signal corresponding to this dialing information to a telephone line in step S112 and sends out the dialing signal to an exchange.

The line selecting section 122c selects the first telephone line LA in sending out the initial signal, and hence the dialing signal is sent out to the first telephone line LA through the first communication control section 122a and the NCU 1.

When the receiving end is connected to the exchange (first telephone line LA), the polarity of the line is inverted. The NCU 1 informs the CPU 122j that the polarity of the line has been inverted. It is discriminated whether the line is connected or not in step S113, and when the line is connected, the CPU 122j then detects a presence of a busy tone in step S114.

When a busy tone is detected, it is determined that the receiving end is busy, and the connected first telephone line LA is released in step S115. Then, it is discriminated whether the number of times of call (transmission) n exceeds 3 or not in step S116. When the number of times of call n is not more than 3, the above-mentioned dialing information is supplied to the auto-dial sending section 122e in step S117, and 1 is added to the current number of times of call n in step S118. The process returns to the above-mentioned step S112 and the same operation as described above is performed until the number of times of call n exceeds 3.

When the number of times of call n exceeds 3, the number of times call n is zeroed in step S119. Then, the line selecting section 122c detects whether an idle line exists besides the first telephone line LA in step S120, and changes over the line to the idle line, i.e., the second telephone line LB in the embodiment, to supply the above-mentioned dialing information to the auto-dial sending section 122e in step S121. The process returns to step S112, and the operations of steps S112 through S118 is performed.

In a case where no busy tone is detected in step S114, a normal facsimile communication is performed in step S122, and when the transmission of data ends in step S123, the connected line is disconnected to end the facsimile operation.

Figure 14:
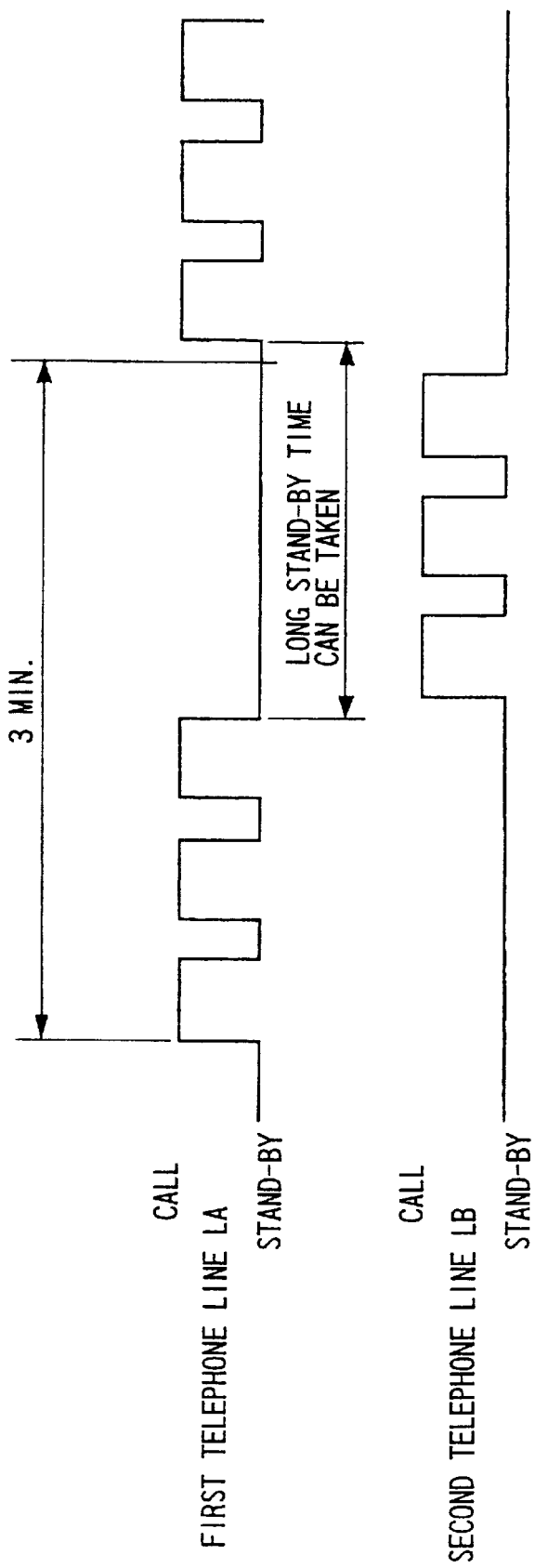
FIG. 14 is a time chart showing calling timings of the facsimile machine according to the fifth embodiment.

FIG. 14 is a time chart showing these line calling operations. A call is made three times consecutively to the same counterpart (receiver) through the second telephone line LB after a call is made three times consecutively through the first telephone line LS at first, so that five times of re-calling (not including the call of the first time) can be made within three minutes. Still more, although re-dialing is made consecutively to the counterpart (receiver), a stand-by time during which the line is not used can be prolonged for one line as a result. The more the number of lines available for the facsimile machine becomes, the longer the stand-by time can be.

Figure 15:
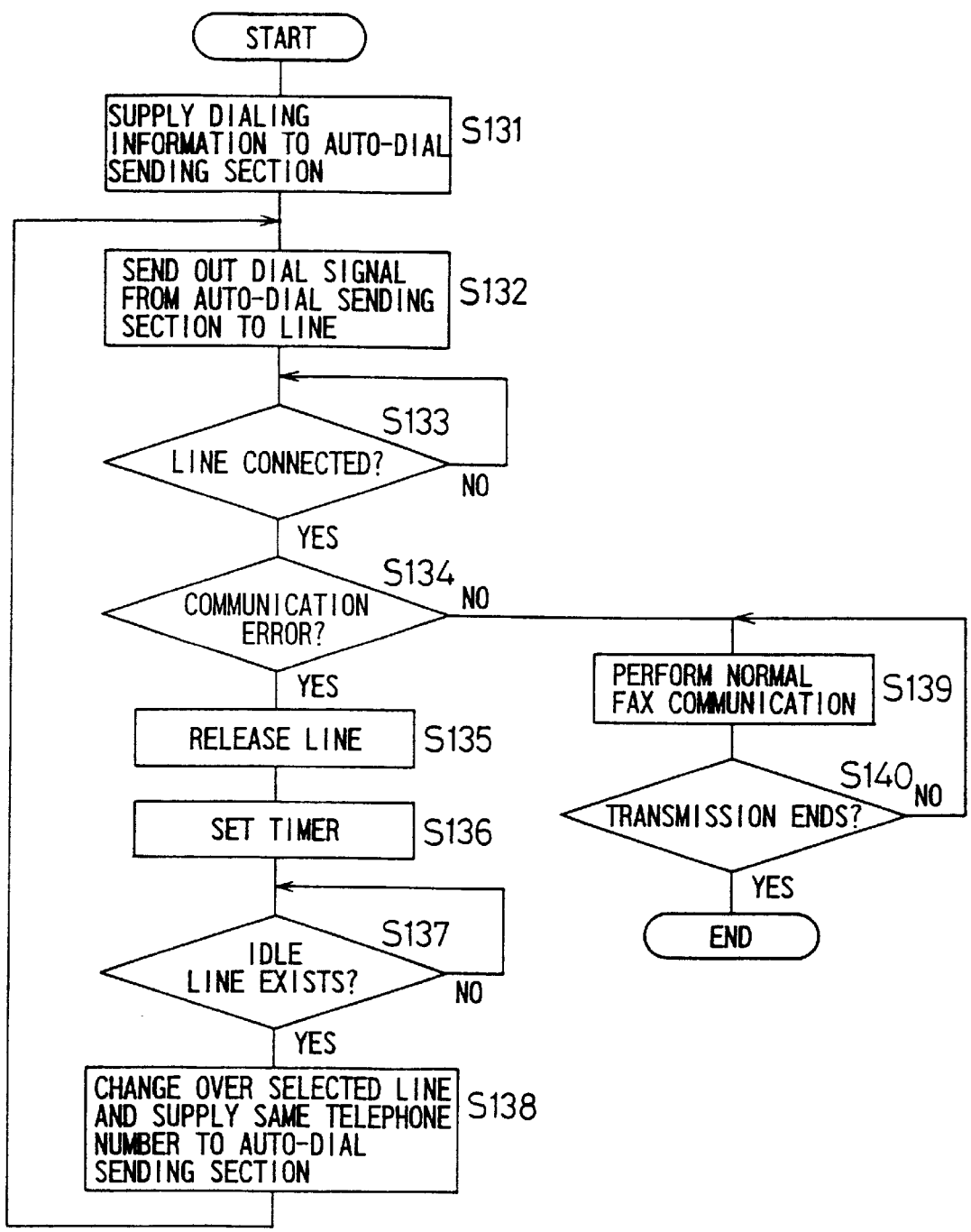
FIG. 15 is a flowchart showing a communication procedure of the digital copier equipped with a facsimile machine according to a sixth embodiment of the invention.
Figure 16:
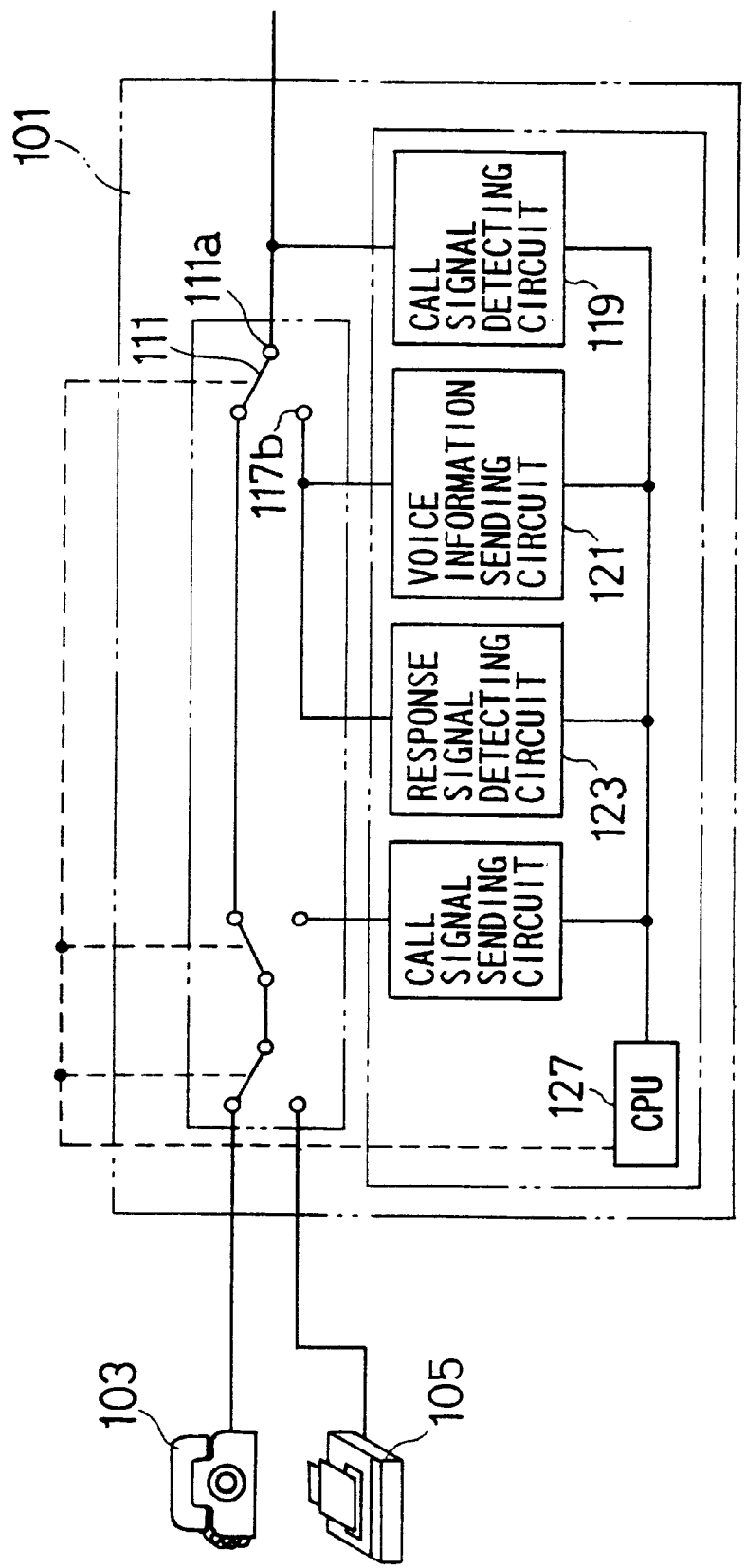
FIG. 16 is block diagram showing a line switching device according to a first prior art technology.
Figure 17:
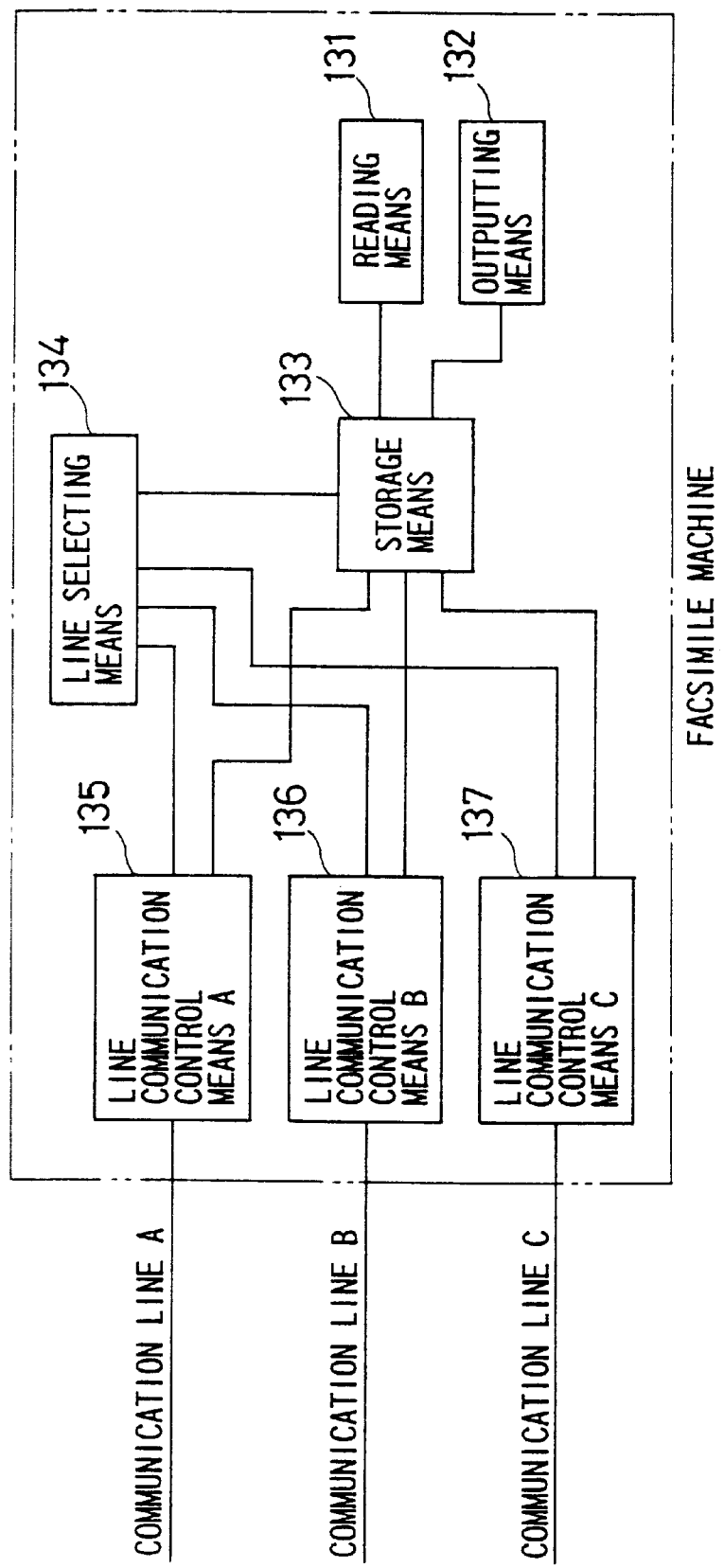
FIG. 17 is a block diagram showing a control section of a second prior art facsimile machine.

Next, a communication procedure of a facsimile machine according to a sixth embodiment of the invention will be explained with reference to FIG. 15.

When the user starts an auto-dialing transmission, the CPU 122j of the facsimile control section 22 receives dialing information via the image control unit (ICU) 3, which dialing information corresponds to a content input by the user through the operating unit 1, and sends this dialing information to the auto-dial sending section 122e in step S131. Then, the auto-dial sending section 122e sends out a dialing signal corresponding to this dialing information to a telephone line in step S132 and sends out the dialing signal to an exchange.

The line selecting section 122c selects the first line in sending out the initial signal, and hence the dialing signal is sent out to the first telephone line LA through the first communication control section 122a and the NCU 1.

When the receiving end is connected to the exchange (the first telephone line LA), the polarity of the line is inverted. Then, the NCU 1 informs the CPU 122j that the polarity of the line has been inverted. It is discriminated whether the first telephone line LA is connected or not in step S133, and when the first telephone line LA is connected, the CPU 122j then detects whether or not a communication error detecting section 122j has detected a communication error in step S134.

When an communication error is detected, the connected first telephone line LA is released in step S135. Then, the timer corresponding to the first telephone line LA is set at the timer section 122h in step S136 and starts counting to be ready for re-dialing.

Then, the line selecting section 122c detects whether an idle line exists besides the first telephone line LA in step S137, changes over the line to the idle line, i.e., the second telephone line LB in the embodiment, to supply the above-mentioned dialing information to the auto-dial sending section 122e in step S138. The process returns to step 132 and the same operations as shown above are performed.

When no communication error is detected in step S134, a normal facsimile communication is performed in step S139, and when the transmission of data ends in step S140, the connected line is disconnected to end the facsimile operation.

The invention may be embodied in other specific forms without departing from the spirit or essential characteristics thereof. The present embodiments are therefore to be considered in all respects as illustrative and not restrictive, the scope of the invention being indicated by the appended claims rather than by the foregoing description and all changes which come within the meaning and the range of equivalency of the claims are therefore intended to be embraced therein.

What is claimed is:

1. A facsimile machine having a function of receiving image data in response to a request-to-send, comprising:

a plurality of line connecting means, each of which has a telephone line for transmitting receiving data;

calling number recognition means for recognizing a calling number of a calling end;

registering means for registering the telephone number recognized by the calling number recognition means;

sending means for sending the telephone number registered by the registering means by using the second telephone line among the plurality of telephone lines;

request-to-send control means for ending a precommunication process of the first telephone line to disconnect the first telephone line at the point of time when a pre-process of the second telephone line is completed by the sending means and making a request-to-send through the second telephone line;

call fee comparing means for comparing a call fee of the telephone line to which the calling end subscribes, with that of the telephone line to which the receiving end subscribes;

telephone line selection means for selecting a telephone line whose call fee is lower based on a comparison result by the call fee comparing means; and selecting second telephone line if the call fee is lower than when the first line is used by the calling end.

2. A facsimile machine having a function of receiving image data in response to a request-to-send, comprising:

a plurality of line connecting means, each of which has a telephone line for transmitting/receiving data;

calling number recognition means for recognizing a calling number of a calling end;

registering means for registering the telephone number recognized by the calling number recognition means;

sending means for sending the telephone number registered by the registering means by using the second telephone line among the plurality of telephone lines;

request-to-send control means for ending a pre-communication process of the first telephone line to disconnect the first telephone line at the point of time when a pre-process of the second telephone line is completed by the sending means and making a request-to-send through the second telephone line;

communication line recognizing means for recognizing a telephone line to which the calling end subscribes, from the calling number recognized by the calling number recognizing means;

call free comparing means for comparing a call fee of the telephone line to which the calling end subscribes, with that of the telephone line to which the receiving end subscribes;

telephone line selecting means for selecting a telephone line whose call fee is lower based on a assumption result by the call fee comparing means;

registering means for registering the telephone number recognized by the calling number recognizing means;

sending means for sending the telephone number registered by the registered means by using the second telephone line among the plurality of telephone lines; and request-to-send control means for ending a pre-communication process of the first telephone line to disconnect the first telephone line at the point of time when a pre-process of the second telephone line is completed and making a request-to-send through the second telephone line, in the case where the call fee of the second telephone line selected by the telephone line selecting means is lower than that of the first telephone line used by the calling end.

3. A facsimile machine having a function of receiving image data in response to a request-to-send, comprising:

a plurality of line connecting means, each of which has a telephone line for transmitting/receiving data;

line selecting means for selecting a telephone line to be used when a plurality of telephone lines are connected; and re-dialing means for changing over the telephone line currently selected by the line selecting means to another telephone line so as to immediately make a call, when the receiving end if busy;

sensing a busy state by detecting a busy tone;

call fee comparing means for comparing a call fee of the telephone line to which the calling end subscribes, with that of the telephone line to which the receiving end subscribes;

telephone line selection means for selecting a telephone line: whose call fee is lower based on a comparison result by the call fee comparing means; and selecting second telephone line if the call fee is lower than when the first line is used by the calling end.

4. The facsimile machine of claim 3, wherein the re-dialing means re-dials through the same line when the receiving end is busy, and changes over the telephone line currently selected by the line selecting means to another telephone line so as to re-dial when a number of times of re-dialing exceeds a predetermined number of times.

5. The facsimile machine of claim 3, comprising:

communication error detecting means for detecting that a line is disconnected due to a communication error in course of communication; and re-dialing means for changing over the telephone line selected by the line selecting means and immediately starting to make a call to the receiving end by using the other telephone line when the communication error detecting means detects the communication error.

\* \* \* \* \*